United States Patent [19]

Möller

[11] 4,247,133
[45] Jan. 27, 1981

[54] DEVICE WITH MOUNTING PLATES FOR A VALVE BATTERY

[75] Inventor: Rudolf Möller, Gehrden, Fed. Rep. of Germany

[73] Assignee: Wabco Steuerungstechnik GmbH & Co., Hanover, Fed. Rep. of Germany

[21] Appl. No.: 58,987

[22] Filed: Jul. 20, 1979

[30] Foreign Application Priority Data

Dec. 6, 1978 [DE] Fed. Rep. of Germany ....... 2852685

[51] Int. Cl.² .................................................. F16L 39/00
[52] U.S. Cl. ...................................... 285/4; 137/271; 285/39; 285/73; 285/137 R; 285/319; 285/DIG. 22
[58] Field of Search ....... 285/137 R, 4, 319, DIG. 22, 285/73, 71, 72; 137/271

[56] References Cited

U.S. PATENT DOCUMENTS

| | | |
|---|---|---|
| 2,510,125 | 6/1950 | Meakin .................... 285/137 R X |
| 3,409,859 | 11/1968 | Krehbiel ..................... 285/319 X |
| 3,469,863 | 9/1969 | Riester et al. ............. 285/137 R X |
| 3,640,552 | 2/1972 | Demler, Sr. et al. ....... 285/137 R X |
| 3,673,541 | 6/1972 | Volinskie .................... 285/319 X |
| 3,917,318 | 11/1975 | Legris ..................... 285/137 R X |
| 4,062,569 | 12/1977 | Kay ................................. 285/4 |
| 4,080,752 | 3/1978 | Burge ..................... 285/137 R X |

FOREIGN PATENT DOCUMENTS 1438060 6/1976 United Kingdom ............... 285/137 R Primary Examiner—Thomas F. Callaghan
Attorney, Agent, or Firm—R. S. Visk; R. W. McIntire, Jr.

[57] ABSTRACT

A valve battery device including mounting plates on which valves may be mounted, and of which a preselected number, each having passageways therein, may be assembled in serial relation to form a valve battery of any desired number. Each mounting plate is provided with one hooked projection and one recess for accommodating the hooked projection of an adjacent mounting plate, and all mounting plates are identical in structure and so constructed that they may be turned end-for-end and top-for-bottom so they may universally assemble. Identically structured terminating plates are provided at each end of the valve battery.

9 Claims, 2 Drawing Figures

DEVICE WITH MOUNTING PLATES FOR A VALVE BATTERY

BACKGROUND OF THE INVENTION

The invention concerns a device with mounting plates for a valve battery, a form of which is already known from German Pat. No. 19 40 894. For mutual fastening of the mounting plates in this known device, it is equipped with conical extensions and corresponding conical tightening elements, in which case the tightening elements enclosing the extensions are fastened to the extensions by means of screw connections situated in the extensions.

For sealing the pressure-medium lines or passageways running through the mounting plates, provision is made for sealing rings that are situated between the mounting plates. For termination of the mounting plate supporting the valve battery, terminating sections are designed and provided as end pieces which also serve for connecting pressure-medium lines to the device.

The known device does indeed require only one uniform mounting plate and one uniform terminating section for valve batteries of various lengths. However, the construction expense for the mutual fastening of the mounting plates is relatively great because in addition to the special construction of the conical extensions, tightening elements and means for screw-coupling are also required.

SUMMARY OF THE INVENTION

Therefore, the object of the invention is to create a device of the type mentioned initially, that is simply constructed and which at the same time makes it possible for the expense for the mutual fastening of the mounting plate to be considerably reduced in comparison with the previously known device.

The invention advantageously utilizes plastic for the mounting plate. A single injection mold for the mounting plates, regardless of the length of the valve battery, makes possible both cost-favorable production and a small cost for storage space.

The mounting plates making up the battery are fastened by snap means or connection which, therefore, provides for fast assembly without special tools both on initial construction of a valve battery and in the changing of a mounting plate or in an extension of the valve battery.

DESCRIPTION AND OPERATION

Figure 1:
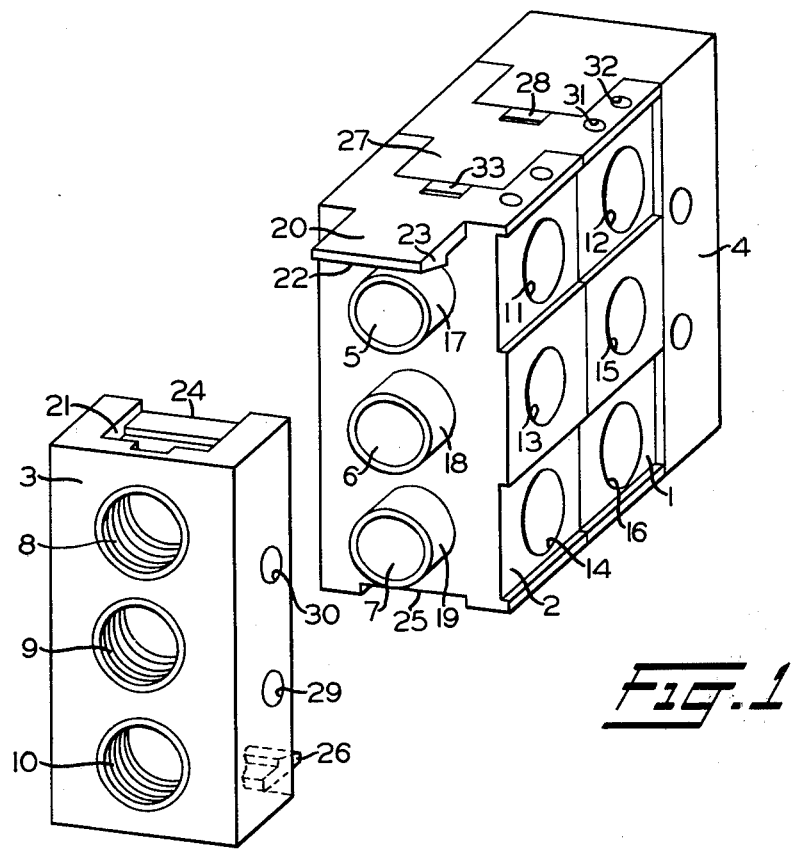
FIG. 1 shows an exploded view, in outline, of a valve battery embodying the invention.

In FIG. 1, there are shown two mounting plates 1 and 2 and two terminating sections 3 and 4; and in said FIG. 1, the two mounting plates and terminating section 4 are shown fastened together. Terminating section 3 is intended to be fastened to mounting plate 2. Additional terminating section 4, that is shown fastened to mounting plate 1, serves to complete a device for a valve battery with two valves (not shown), each fastened to one of the mounting plates 3 or 4.

Each of the mounting plates, as may be seen on mounting plate 1, for example, is equipped with three fluid pressure passageways 5, 6, and 7 to which conventional fluid pressure connections 8, 9, and 10, respectively, of terminating section 3 are connected for effecting corresponding communications with the valves (not shown). The communication from connection 8, for example, of the terminating section 3, runs via a fluid pressure line (not shown) connected thereto, a connection 5 in mounting plate 2, and corresponding fluid pressure passageways (not shown) formed in mounting plates 2 and 3, to a connection 11 of mounting plate 2 and a connection 12 of mounting plate 1. Connection 11 of mounting plate 2 and connection 12 of mounting plate 1 are provided for communicating connection 8 to the valves (not shown) assigned to mounting plates 1 and 2. Correspondingly, connections 9 and 10 of terminating section 3 are communicated with connections 13 and 14, respectively, of mounting plate 2 and connections 15 and 16 of mounting plate 1. The pressure-tight connection of the fluid pressure passageways in mounting plates 1 and 2 and the terminating section 3 is accomplished by the fact that each of the mounting plates is equipped at one end with tubular projections 17, 18, and 19 that project into the fluid pressure connections 8, 9, and 10, respectively, of the adjacent members (terminating section or mounting plate) and are there sealed with a sealing ring. This is described in further detail below in connection with FIG. 2.

Mounting plate 2 is equipped on the upper side thereof, as viewed in FIG. 1, with a hook-shaped projection or tongue 20 on the end facing terminating section 3, which projection is designed as a resilient tongue for snap-on action. In cooperation with a complementary recess 21 appropriately located on said terminating section so that after joining of the terminating section 3 and the mounting plate 2, projection 20 of the mounting plate lies completely within recess 21 of the terminating section. This type of snap connection not only has the advantage of being able to transmit tensile forces but can also safely absorb shear forces, because each tongue 20 is more than half the width of the upper or lower surface of the mounting plate itself. In this way, an outstanding mutual fastening of terminating section 3 and mounting plate 2 is achieved.

In order to facilitate the joining of the terminating section 3 and mounting plate 2, the projection 20 is equipped with a slanted surface 22 on a hook-shaped portion 23, which surface serves as a sliding surface for a frontal edge 24 of recess 21 in terminating section 3.

On the side facing projection 20 of the end of mounting plate 2 facing terminating section 2, mounting plate 1 is equipped with a recess 25 that serves to accommodate a projection 26 of terminating section 3. Recess 25 of mounting plate 2 and projection 26 of terminating section 3 form a snap connection of the same design as in the case of projection 20 and the recess 21.

On the end of mounting plate 2 adjacent to and facing mounting plate 1, said mounting plates are similarly equipped with a hook-shaped projection and a corresponding recess, respectively, on the under side, as viewed in FIG. 1, and, therefore, not visible in the view. Correspondingly, the recess on this end of mounting plate 2 is on the same side of said mounting plate as projection 20. The mounting plate 2 is thus so designed that with respect to the hook-shaped projections and the corresponding recesses, after a 180° rotation in the plane also containing the mounting plate 1 and the terminating section 4, it is in the same installation position as before the rotation.

One will recognize that this interchangeability of the ends of the mounting plate 2 makes possible the utilization of a single construction for valve batteries with arbitrarily many mounting plates and also the utilization of a single terminating section corresponding to the terminating section 3 for both ends of the valve battery.

Mounting plate 1 is constructed exactly the same as mounting plate 2. A projection 27 and a recess 28 as well as the corresponding parts (not shown) on the other side of mounting plate 1 correspond in their design and function to the projection 20 of mounting plate 2 and recess 21 of terminating section 3.

For fastening terminating section 3 to a machine or mounting wall, it is equipped with bores 29 and 30. For the attachment of the valves (not shown) to the mounting plates 1 and 2, bores are used, of which only bores 31 and 32 in mounting plate 1 are shown for the sake of simplicity. Further, the mechanical connection of the mounting plates is so solid that it suffices to fasten only one terminating section to the machine or mounting wall in question.

To simplify the disassembly of two mounting plates or of a unit consisting of a mounting plate and a terminating section, it is advantageous to design the projections (e.g. 20) and the recesses (e.g. 21) in such a way that between the end of the projections and the end or bottom of the recesses accommodating the projections, there is provided a clearance space 33 suitable for the insertion or application of a tool. In this way, the projection in question can be pried upward so that the snap-connection is released.

Figure 2:
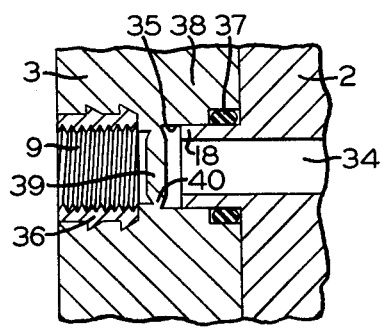
FIG. 2 is a sectional view showing an internal pressure-tight connection of a mounting plate to a terminating section.

FIG. 2 is a fragmentary elevational view of a section encompassing abutting portions of terminating section 3 and mounting plate 2, in which a pressure-tight connection of the tubular projection 18 of a fluid pressure passageway 34 formed in said mounting plate with a fluid pressure passageway 35 formed in said terminating section is shown on an enlarged scale.

Connection 9 of the terminating section 3 is fitted with a threaded bushing 36 in order to accommodate and effect nection of a fluid pressure line, such as a fluid pressure connection of a fluid pressure line, such as a fluid pressure supply line (not shown).

The tubular projection 18 of mounting plate 2 projects into fluid pressure passageway 35 of terminating section 3. Sealing is effected by an O-ring 37 situated in an annular extension 38 of the terminating section 3.

In fluid pressure passageway 35 of terminating section 3, there is shown a closure member 39 that is connected integrally via a relatively thin wall 40 with the wall of said fluid pressure passageway. Wall 40 of closure member 39 is a breakaway type so that in case of need, closure member 39 can be punched out. If a fluid pressure-tight closure of a fluid pressure passageway is required in terminating section 3, then it is not necessary to turn a threaded plug into the corresponding threaded bore (e.g. 36) and, rather, one simply leaves the corresponding closure (e.g. 39) in the pressure-medium line 35.

Having now described the invention, what I claim as new and desire to secure by Letters Patent, is:

1. A valve battery device with mounting plates having at least one fluid pressure passageway therein via which fluid pressure may flow to and from valve connections formed in the mounting plates and fastening means for serially fastening a plurality of said mounting plates in a pressure-tight abutting relationship, said battery device comprising:
   (a) a selected number of mounting plates, each provided with a resilient hook-shaped projection and a recess for accommodating the hook-shaped projection of the adjacent mounting plate,
   (b) said projections and recesses of each mounting plate being arranged thereon so that one abutting end, on opposite sides thereof, is provided with a projection and a recess; and on the other abutting end, on opposite sides thereof, with a recess and projection in opposite relation to those in said one abutting end.

2. A valve battery device, according to claim 1, characterized in that said projections are designed as flat tongues and are wider than half of the width of the upper and lower surfaces of the mounting plate, an extension of which they form.

3. A valve battery device, according to claim 1, wherein each of said projections comprises a hook portion and wherein each recess is of such axial dimension that said projections, when in a fastened disposition, extend into the recesses an axial amount greater than the overall axial length of the hook portion of the projections.

4. A valve battery device, according to claim 3, wherein the projections are so dimensioned that when in their fastened disposition, they lie essentially entirely within the recesses.

5. A valve battery device, according to claim 4, characterized in that said hook-shaped portion of the projection has a slanted surface that is so disposed as to serve as a sliding surface for sliding over the frontal highest edge of the recess during fastening action.

6. A valve battery device, according to claim 1, further characterized by respective terminating sections disposed at each end of an assemblage of said mounting plates and in which, corresponding to the mounting plates, at least one fluid pressure passageway is formed and which is equipped with a hook-shaped projection and a recess at one end only.

7. A valve battery device, according to claim 1, wherein each mounting plate is provided at one end with tubular projections as respective extensions of the fluid pressure passageways.

8. A valve battery device, according to claim 6, characterized in that each of the fluid pressure passageways of the terminating section is provided with a punch-out type closure member for sealing off the fluid pressure passageways, each of said closure members being integrally attached with the terminating section and being selectively removable from the terminating section for opening communication through the selected passageway.

9. A valve battery device, according to claim 4, characterized in that the projections and the recesses are dimensioned such that when in assembled position, a clearance space is provided between the end of the projection and the adjacent end of the respective recess engaging the projection for accommodating an appropriate tool for disengaging the projection from the recess.

* * * * *